(12) United States Patent
Lennon et al.

(10) Patent No.: US 10,850,451 B2
(45) Date of Patent: Dec. 1, 2020

(54) FLUID SYSTEM AND METHOD OF MANUFACTURE VIA FRICTION WELDING

(71) Applicant: LenLok Holdings, LLC, Willoughby, OH (US)

(72) Inventors: William H. Lennon, Hunting Valley, OH (US); George Hodson, Rock Creek, OH (US)

(73) Assignee: LENLOK HOLDINGS, LLC, Willoughby, OH (US)

( * ) Notice: Subject to any disclaimer, the term of this patent is extended or adjusted under 35 U.S.C. 154(b) by 755 days.

(21) Appl. No.: 15/638,726

(22) Filed: Jun. 30, 2017

(65) Prior Publication Data
US 2018/0001571 A1    Jan. 4, 2018

Related U.S. Application Data

(60) Provisional application No. 62/451,206, filed on Jan. 27, 2017, provisional application No. 62/357,669, filed on Jul. 1, 2016.

(51) Int. Cl.
*B23K 20/12* (2006.01)
*B29C 65/06* (2006.01)
(Continued)

(52) U.S. Cl.
CPC .......... *B29C 65/0681* (2013.01); *B23K 20/12* (2013.01); *B23K 20/227* (2013.01);
(Continued)

(58) Field of Classification Search
CPC ....... B23K 20/12–1215; B23K 20/1285–1295; B23K 2101/04–125
(Continued)

(56) References Cited

U.S. PATENT DOCUMENTS 3,269,003 A    8/1966 Bernard et al.
4,047,739 A    9/1977 Aitken
(Continued)

FOREIGN PATENT DOCUMENTS

DE    102011087595 A1 *  6/2013  .............. F16F 9/325
JP         53102249 A *  9/1978  ........... B23K 20/129
(Continued)

OTHER PUBLICATIONS

International Search Report for corresponding International Application No. PCT/US2017/040227 dated Oct. 18, 2017.
(Continued)

*Primary Examiner* — Kiley S Stoner
(74) *Attorney, Agent, or Firm* — Pearne & Gordon LLP

(57) ABSTRACT

A method of friction welding a workpiece to a fluid element includes the step of placing a workpiece weld surface in contact with a fluid element weld surface. The workpiece weld surface is driven in a predetermined pattern along the fluid element weld surface. Pressure is applied between the workpiece weld surface and the fluid element weld surface to produce friction and heat sufficient to raise the temperature of the weld surfaces to welding temperature. A weld bond is formed by stopping the driving of the workpiece weld surface while applying the pressure between the weld surfaces. Before and/or after the weld bond is formed, at least a portion of the workpiece is machined to form at least a portion of a fluid fitting configured to receive and sealingly attach to a pipe in a non-leaking manner to convey a flow of fluid therethrough.

29 Claims, 10 Drawing Sheets

(51) Int. Cl.
| | |
|---|---|
| *B23K 20/227* | (2006.01) |
| *B23K 33/00* | (2006.01) |
| *E21B 17/08* | (2006.01) |
| *F16L 13/02* | (2006.01) |
| *B23K 103/04* | (2006.01) |
| *B23K 103/08* | (2006.01) |
| *B23K 103/18* | (2006.01) |
| *B23K 101/06* | (2006.01) |
| *F16L 13/14* | (2006.01) |

(52) U.S. Cl.
CPC ........... *B23K 33/006* (2013.01); *E21B 17/08* (2013.01); *F16L 13/0236* (2013.01); *B23K 20/129* (2013.01); *B23K 2101/06* (2018.08); *B23K 2103/04* (2018.08); *B23K 2103/05* (2018.08); *B23K 2103/08* (2018.08); *B23K 2103/18* (2018.08); *F16L 13/02* (2013.01); *F16L 13/146* (2013.01)

(58) Field of Classification Search
USPC .......... 228/110.1, 1.1, 112.1–114.5, 2.1–2.3; 156/580.1–580.2, 73.1–73.6
See application file for complete search history.

(56) References Cited

U.S. PATENT DOCUMENTS

| | | | | |
|---|---|---|---|---|
| 4,119,334 | A | | 10/1978 | Steed |
| 4,331,280 | A | | 5/1982 | Terabayashi et al. |
| 5,110,163 | A | | 5/1992 | Benson et al. |
| 5,154,340 | A | | 10/1992 | Peacock |
| 5,167,310 | A | | 12/1992 | Fischer et al. |
| 5,213,250 | A | | 5/1993 | Simon |
| 5,305,510 | A | | 4/1994 | Croft et al. |
| 5,636,875 | A | * | 6/1997 | Wasser .................... F16L 47/02 285/21.1 |
| 5,709,418 | A | | 1/1998 | Benson et al. |
| 6,131,964 | A | | 10/2000 | Sareshwala |
| 6,199,916 | B1 | * | 3/2001 | Klinger ............. B29C 66/12441 285/288.1 |
| 6,375,232 | B1 | * | 4/2002 | Robinson .............. F16L 15/008 228/112.1 |
| 6,532,655 | B1 | * | 3/2003 | Ahn ........................ B21K 1/18 228/113 |
| 6,692,040 | B1 | | 2/2004 | McKay et al. |
| 6,832,785 | B1 | * | 12/2004 | Zitkovic, Jr. ....... B29C 65/0672 156/73.5 |
| 7,093,864 | B2 | | 8/2006 | Wasmuth |
| 7,575,257 | B2 | | 8/2009 | McKay |
| 7,726,542 | B2 | | 6/2010 | Kleber |
| 7,806,444 | B2 | | 10/2010 | Blivet et al. |
| 7,938,310 | B2 | | 5/2011 | Kleber |
| 7,988,032 | B2 | * | 8/2011 | Bass ....................... B23K 20/12 228/112.1 |
| 8,870,237 | B2 | | 10/2014 | Sindelar |
| 9,249,905 | B2 | | 2/2016 | Mezzalira |
| 2002/0014514 | A1 | * | 2/2002 | Shimizu .................. F16L 13/00 228/104 |
| 2002/0122955 | A1 | * | 9/2002 | McCabe ................ B23K 20/12 428/544 |
| 2004/0145183 | A1 | | 7/2004 | Wasmuth |
| 2005/0022383 | A1 | * | 2/2005 | Kishi .................. B29C 65/0672 29/890.126 |
| 2005/0145316 | A1 | * | 7/2005 | Benjey ............... B29C 65/0672 156/73.5 |
| 2007/0261226 | A1 | * | 11/2007 | Deul ...................... E21B 17/01 29/525.13 |
| 2008/0012309 | A1 | * | 1/2008 | Blivet ............... B29C 66/52297 285/288.1 |
| 2010/0052317 | A1 | * | 3/2010 | Mezzalira ............... B29C 57/00 285/330 |
| 2010/0139077 | A1 | * | 6/2010 | Linzell .................... F16L 37/02 29/525 |
| 2011/0031299 | A1 | * | 2/2011 | Bray ........................ F01D 5/34 228/112.1 |
| 2011/0163536 | A1 | | 7/2011 | Sindelar |
| 2011/0315299 | A1 | * | 12/2011 | Eckardt ............. B29C 66/12441 156/73.5 |
| 2013/0118629 | A1 | | 5/2013 | Mezzalira |
| 2013/0180728 | A1 | | 7/2013 | Hugghins |
| 2014/0205369 | A1 | | 7/2014 | Dietrich et al. |
| 2016/0158878 | A1 | | 6/2016 | Okada et al. |
| 2016/0265473 | A1 | * | 9/2016 | Jiang ........................ F01L 3/08 |

FOREIGN PATENT DOCUMENTS

| | | | | | |
|---|---|---|---|---|---|
| JP | | 63-60081 A | | 3/1988 | |
| JP | | 63225714 A | * | 9/1988 | |
| JP | | 2004-525804 A | | 8/2004 | |
| JP | | 2013-516587 A | | 5/2013 | |
| WO | | 2008007230 A2 | | 1/2008 | |
| WO | WO-2014152842 A2 | * | 9/2014 | .......... B23K 20/227 |
| WO | | 2015/016319 A1 | | 2/2015 | |

OTHER PUBLICATIONS

Written Opinion for corresponding International Application No. PCT/US2017/040227 dated Oct. 18, 2017.
Japanese Office Action dated Mar. 2, 2020 for corresponding Japanese Application No. 2018-565838.

* cited by examiner

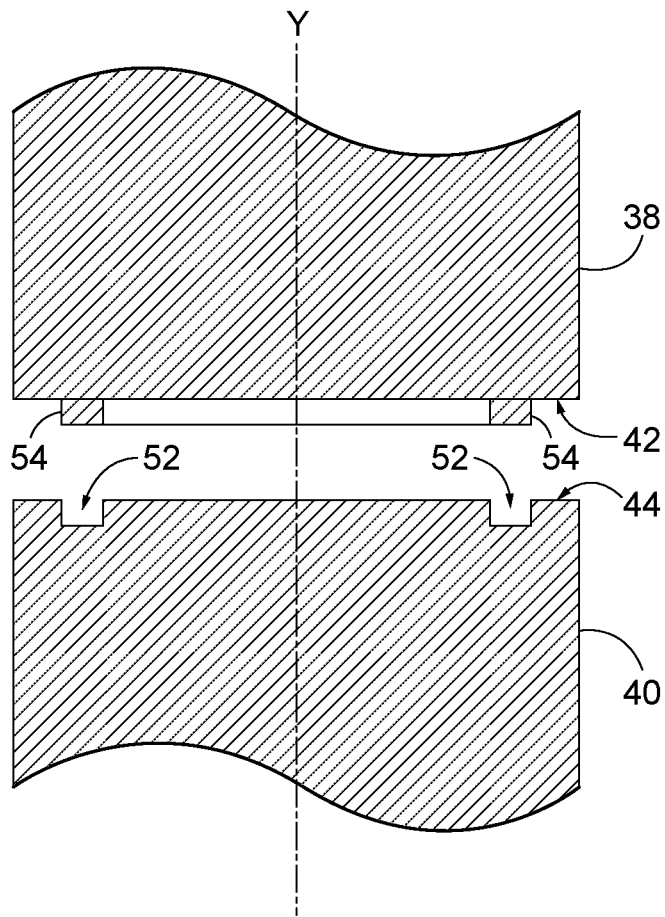
FIG. 6A
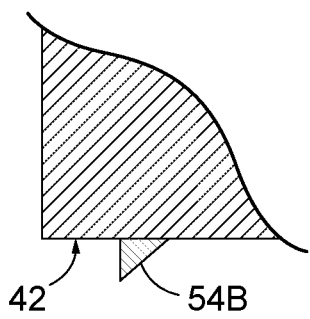 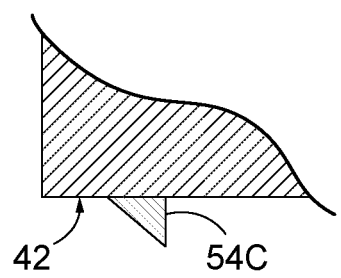 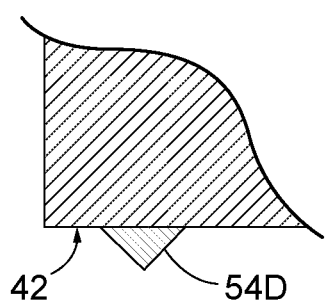
FIG. 6B  FIG. 6C  FIG. 6D

FLUID SYSTEM AND METHOD OF MANUFACTURE VIA FRICTION WELDING

CROSS-REFERENCE TO RELATED APPLICATIONS

Benefit of U.S. Provisional Patent Application Ser. No. 62/357,669, filed Jul. 1, 2016, and U.S. Provisional Patent Application Ser. No. 62/451,206, filed Jan. 27, 2017 are hereby claimed and the disclosures incorporated herein by reference.

BACKGROUND

1. Field of the Invention

The following description relates generally to a fluid system for mechanically attaching and sealing a fluid element, and more particularly, to a method of manufacturing the fluid system via a friction welding process.

2. Related Art and Background

Fluid systems typically comprise a plurality of fluid elements that are fluidly coupled together to form a system that conveys fluid from one area to another. It is often desired that the fluid elements are permanently connected to each other. In order to permanently connect the fluid elements and to prevent leaking between the fluid elements typically the fluid elements will be welded together.

BRIEF SUMMARY OF THE INVENTION

The following presents a simplified summary of example embodiments of the invention. This summary is not intended to identify critical elements or to delineate the scope of the invention.

In accordance with one aspect, a method of friction welding a workpiece to a fluid element comprises the steps of placing a weld surface of a workpiece in contact with a weld surface of a fluid element, and driving one of the workpiece weld surface and the fluid element weld surface in a predetermined pattern along the other of the workpiece weld surface and the fluid element weld surface. The method further includes the step of applying pressure along a press axis between the workpiece weld surface and the fluid element weld surface so that said driving of said one of the workpiece weld surface and the fluid element weld surface in a predetermined pattern along the other of the workpiece weld surface and the fluid element weld surface produces friction and heat for a time sufficient to raise the temperature of the workpiece weld surface and the fluid element weld surface to welding temperature. The method further includes the steps of stopping said driving of said one of the workpiece weld surface and the fluid element weld surface while applying the pressure between the workpiece and the fluid element until the weld surfaces form a welded bond, and after the welded bond is formed, machining at least a portion the workpiece to form at least a portion of a fluid fitting configured to receive and sealingly attach to a pipe in a non-leaking manner to convey a flow of fluid therethrough.

In accordance with another aspect, a method of friction welding a fluid fitting to a fluid element comprises the steps of placing a weld surface of a fluid fitting in contact with a weld surface of a fluid element, and driving one of the fluid fitting weld surface and the fluid element weld surface in a predetermined pattern along the other of the fluid fitting weld surface and the fluid element weld surface. The method further includes the step of applying pressure along a press axis between the fluid fitting weld surface and the fluid element weld surface so that said driving of said one of the fluid fitting weld surface and the fluid element weld surface in a predetermined pattern along the other of the fluid fitting weld surface and the fluid element weld surface produces friction and heat for a time sufficient to raise the temperature of the fluid fitting weld surface and the fluid element weld surface to welding temperature. The method further includes the step of stopping said driving of said one of the fluid fitting weld surface and the fluid element weld surface while applying the pressure between the fluid fitting and the fluid element until the weld surfaces form a welded bond, wherein the fluid fitting is configured to receive and sealingly attach to a pipe in a non-leaking manner to convey a flow of fluid therethrough.

In accordance with a further aspect, a permanently sealed fluid system is provided, comprising a fluid fitting with a coupling body having an inner surface defining a bore for receiving a pipe therein at at least one end thereof and a fluid fitting weld surface at least partially disposed on a face surface of the bore. A ring is positioned to fit over the at least one end of the coupling body for mechanically attaching the coupling body to the pipe, and a main seal formed on the inner surface of the coupling body to engage the pipe. When the ring is installed on the at least one end of the coupling body via force, the ring and coupling body apply a compressive force to the main seal sufficient to cause elastic deformation of the ring and permanent deformation of the coupling body and pipe to thereby attach the pipe to the coupling body in a non-leaking manner. The permanently sealed fluid system further comprises a first workpiece comprising a first piece weld surface that is permanently sealed in a non-leaking manner to the fluid fitting weld surface by a weld joint, which is obtainable by friction welding the fluid fitting weld surface and the first piece weld surface together to form a sealed fluid connection.

BRIEF DESCRIPTION OF THE DRAWINGS

Embodiments of the present application will now be described in further detail with reference to the accompanying drawings, in which:

FIGS. 6A-6D schematically illustrate example alignment structure;

DETAILED DESCRIPTION OF THE INVENTION

Figure 1:
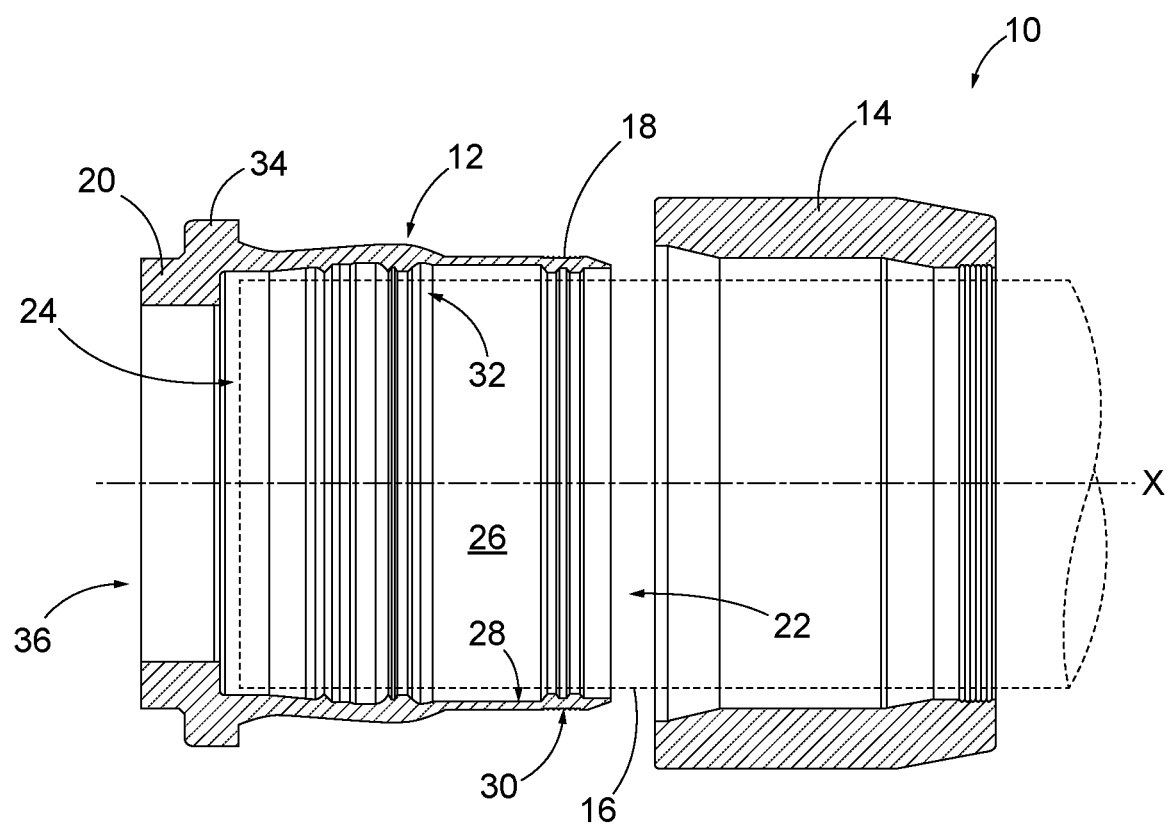
FIG. 1 schematically illustrates a sectional view of an example fluid fitting.

In the following description of the present invention reference is made to the accompanying drawings which form a part thereof, and in which is shown, by way of illustration, example embodiments illustrating the principles of the present invention and how it may be practiced. It is to be understood that other embodiments may be utilized to practice the present invention and structural and functional changes may be made thereto without departing from the scope of the present invention.

Embodiments of the present invention relate to a friction welded fluid system. The present invention will now be described with reference to the drawings, wherein like reference numerals are used to refer to like elements throughout. It is to be appreciated that the various drawings are not necessarily drawn to scale from one figure to another or within a given figure. Also, the sizes of the components are somewhat arbitrarily drawn in order to facilitate an understanding of the drawings. In the following description, numerous specific details are set forth in order to provide a thorough understanding of the present invention, but it can be possible in certain instances to practice the present invention without those specific details. Additionally, the examples discussed are not intended to be a limit on the invention. For example, one or more aspects of the disclosed examples can be utilized in other examples and even other types of apparatus, devices, and methods.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the invention in any manner. It is to be understood that embodiments presented herein are by way of example and not by way of limitation. The intent of the following detailed description, although discussing example embodiments, is to be construed to cover all modifications, alternatives, and equivalents of the embodiments as may fall within the spirit and scope of the invention.

Fluid systems typically comprise a plurality of fluid elements that are fluidly coupled together to form a system that conveys fluid from one area to another. For the purposes of this disclosure, the term "fluid" refers to any liquid or gas and is not solely related to any particular type of fluid. Additionally, it is contemplated that the fluid system described herein can be capable of carrying bulk solids in addition to or in lieu of a fluid. For the purposes of this disclosure, the term "fluid element", as used herein, refers to a structure that is configured to contain fluid, dispense fluid, receive fluid, and/or convey fluid therethrough. Such fluid elements can include, for example, tubes, pipes, manifolds, fluid connectors, valves, pumps, nozzles, reservoirs, sensor systems, any combination thereof, or any other element that is configured to contain fluid, dispense fluid, receive fluid, and/or convey fluid therethrough.

It is often desired that a fluid fitting is permanently connected to an end connector that is used to fluidly couple the fluid element to some corresponding structure. Such end connectors can be off-the-shelf or custom manufactured. Conventionally, the fluid fitting is hot welded to the end connector. The fluid fitting is welded to the end connector, such as manually or by "machine type" pulse gas tungsten arc welding process (GTAW-P). The finished combined fitting provide a unique, cost effective alternative to traditional field welded pipe fittings. However, although the machine type GTAW-P process produces a consistent high quality weld superior to traditional "field" welded processes, it produces a relatively large weld surface area and heat affected zone (HAZ). The GTAW-P process is a "hot work" process where the material transitions from a solid state to a molten state as a result of the heat generated by the welding arc. The process requires shielding gas and the introduction of filler metal into the molten weld pool making the weld joint susceptible to contamination resulting in porosity (gas pockets in the weld). An improved permanent connection is desired.

Friction welding is a low temperature, solid state welding process. The process does not liquefy the metal but heats the material to a plastic state. The heat is generated through friction by moving one part against another, and then applying a forging force to the mated components. The bond-line created between the mating materials creates a very small heat-affected zone (HAZ), small weld surface area, and maintains the material micro-structure and most material properties. Friction welding produces a full cross-sectional surface forging that yields a very high strength, low stress weld with no porosity, and in most cases, eliminates the need for special joint designs or critical joint fit-up. The weld joint strength is consistently equal to or stronger than the parent material strength.

The friction welding process can be accomplished without the use of filler metals, fluxes, or shielding gases. It also minimizes energy consumption, produces little or no fumes, gases, smoke, or waste. The process is highly controlled and produces repeatable, CNC controlled high quality weld joints. Typically, friction welded components are circular. However, with today's technologies, the applications, components, material types, sizes and shapes that can be joined are almost endless. The ability to create near-net shape blanks creates an opportunity to reduce material consumption and shorten machining cycle time. Joining dissimilar metals like stainless steel alloys to other metals provides unique design flexibility.

Turning to FIG. 1, illustrated is one embodiment of a fluid fitting 10. The example fitting includes a fitting body 12 and can further include a drive ring 14 that together are utilized to join pipe(s) 16 to the fluid fitting 10. In one embodiment, the fitting body 12, drive ring 14, and pipe 16 are generally symmetrical about a central axis X and include predetermined ratios of interference therebetween along the length of a cylindrical contact area. The fluid fitting 10 may be utilized to connect either thin walled or thick walled pipes, such as those ranging in size from ¼" NPS to 4" NPS, although other pipe sizes may also derive a benefit from the example fitting. Various example fittings are shown in commonly owned U.S. Pat. Nos. 8,870,237; 7,575,257; 6,692,040; 6,131,964; 5,709,418; 5,305,510; and 5,110,163, which are all expressly incorporated herein by reference in their entirety.

Broadly speaking, installation of the fluid fitting 10 upon a pipe 16 can cause permanent, irreversible deformation of the pipe 16 that it is coupled to, providing a metal-to-metal seal between the pipe 16 and the fitting body 12. In the embodiment shown in FIG. 1, the fitting body 12 has a first portion 18 and a second portion 20 that respectively define a first opening 22 and a second opening 24. The fitting body 12 can comprise any number of portions according to the desired use. The first and second openings 22, 24 are in fluid communication with each other through a passageway or bore 26 in the fitting body 12.

In one embodiment, the first portion 18 of the fitting body 12 is in the form of a sleeve that is generally symmetrical about a central axis X. The first portion 18 includes an inner surface 28 and an outer surface 30. The inner surface 28 can define one or more inwardly directed ridge 32 or teeth that can form a seal between the fluid fitting 10 and the pipe 16. The ridge 32 can extend along the inner surface 28 either fully or partially about the central axis X. The ridge 32 forms a tooth that is configured to grip the pipe 16 when the fluid fitting 10 is connected to the pipe 16. The seals can include any of an inboard seal, main seal(s), an outboard seal, and the like. The second portion 20 of the fitting body 12 in the current embodiment is likewise in the form of a sleeve that is generally symmetrical about the central axis X. However, the first and second portions 18, 20 of the fitting body 12 can take any shape for the desired use.

In one embodiment, the first portion 18 and the second portion 20 are aligned such that fluid can communicate between the first and second openings 22, 24 through the passageway or bore 26 in a straight path along the central axis X. However, it is to be appreciated that the first and second portions 18, 20 may be alternatively aligned in other examples. For instance, in one example, the second portion 20 may be aligned transverse (e.g. substantially perpendicular) to the central axis X and the passageway or bore 26 can have a bend (e.g., a 90° turn) to allow fluid communication between the first and second openings 22, 24. In other examples, the bend can be less than a 90° turn. Moreover, although the first and second portions 18, 20 are described above as being generally symmetrical structures, it is to be appreciated that either or both of the first and second portions 18, 20 may be asymmetrical in some examples.

The first portion 18 is configured to accept a portion of the pipe 16 therein. The drive ring 14 can be axially slid (i.e., along the central axis X) over the first portion 18 while the pipe 16 is received within the first portion 18 to fix the pipe 16 to the first portion 18. More specifically, the fluid fitting 10 is designed to comprise predetermined ratios of interference between the drive ring 14, the first portion 18, and the pipe 16 about the central axis X. Thus, as the drive ring 14 is slid axially over the first portion 18 toward a flange 34 of the fitting body 12, the drive ring 14 will interfere with the first portion 18 and compress the first portion 18 radially inward (i.e., toward the central axis X), which in turn will interfere with the pipe 16 and deform the pipe 16. In particular, the at least one ridge 32 of the first portion 18 will bite into the exterior surface of the pipe 16 (e.g., into the outer periphery of the pipe 16), thereby causing deformation to the pipe 16 and forming a fluid tight, metal-to-metal seal between the pipe 16 and the first portion 18 that will fix the pipe 16 to the first portion 18. In one embodiment, the first portion 18 is designed to interfere with the pipe 16 such that the at least one ridge 32 will compress and deform the pipe 16 first elastically and then plastically, thereby forming a 360° circumferential, permanent, metal-to-metal seal between the pipe 16 and the first portion 18.

The first portion 18 of the fluid fitting 10 is thus designed such that the fluid fitting 10 can be fixed to the pipe 16 by inserting a portion of the pipe 16 into the first portion 18 of the fluid fitting 10 and then sliding the drive ring 14 axially over the first portion 18 toward the flange 34. Moreover, the portion of the pipe 16 inserted into the first portion 18 of the fluid fitting 10 can have an opening 36 such that when the fluid fitting 10 and pipe 16 are fixed as such, the opening 36 of the pipe 16 will be in fluid communication with the passageway or bore 26 of the fluid fitting 10. Thus, the first portion 18 and drive ring 14 of the fluid fitting 10 can permit a fluid coupling between the pipe 16 and the fluid fitting 10.

The drive ring 14 can be forced axially on the sleeve to a final installed position during the sealing process. In the final installed position, the drive ring 14 can abut or engage the flange 34. Alternatively, the drive ring 14 could be positioned adjacent the flange 34 without contact therewith in the final installed position. In another alternative, the fluid fitting 10 may not include a flange and the drive ring 14 will be forced axially until the desired final installed position is reached. Simultaneous with radial movement of the first portion 18 and the deformation of the pipe 16, radial movement of the drive ring 14 occurs outwardly. This radial movement of the drive ring 14 is typically elastic, and results in only a small increase in the diameter of the drive ring 14. However, the radial movement of the drive ring 14 in other embodiments can be more than the elastic radial movement.

In some examples, the second portion 20 of fluid fitting 10 can be similarly configured as the first portion 18 such that a pipe 16 may be inserted within and a drive ring 14 can be slid over the second portion 20 to fluidly couple the pipe 16 to the second portion 20. However, in some applications, a different type of connection may be desirable such as, for example, a threaded connection or a crushable ferrule, etc. Moreover, in some applications, it may be desirable for the second portion 20 of the fluid fitting 10 to be permanently attached to another fluid element so that installation of the fluid fitting 10 to the fluid element in the field is not necessary. As one approach to manufacturing fluid fittings 10 for such various applications, multiple fluid fittings 10 can be produced with various types of fluid elements (e.g., pipes, connectors, etc.) integrally formed with the second portions 20 of their bodies. However, such an integrated approach would require different processing techniques (e.g., different machining techniques and fixtures, different molds, etc.) to be used for each different fluid fitting 10. Furthermore, with conventional manufacturing techniques, integrating the body 12 of a fluid fitting 10 with another structure may be undesirable if different materials are desired for the body 12 and the other structure. Thus, a novel manufacturing process will now be described where the second portion 20 of each fluid fitting 10 is permanently connected to another non-integrated structure via a friction welding process, which can eliminate the conventional drawbacks associated with integrating the structure and fluid fitting 10.

Applicant has discovered two different types of friction welding that are well-suited to the manufacture of combined fittings of the type described herein. The first is so-called "spin welding" where the friction is generated by rotating at least a surface of a first workpiece continuously across a surface of a second workpiece while applying a forging force to the workpieces to press the two surfaces together. The second is so-called "linear friction welding" where the friction is generated by sliding at least a surface of a first workpiece back-and-forth (i.e., a linear sliding movement) across a surface of a second workpiece while applying a forging force to the workpieces to press the two surfaces together.

Various manufacturing combinations will now be discussed. Either of the above discussed friction welding methods may be used in the following combinations or another friction welding method may be used to generate friction between the workpieces.

Figure 2:
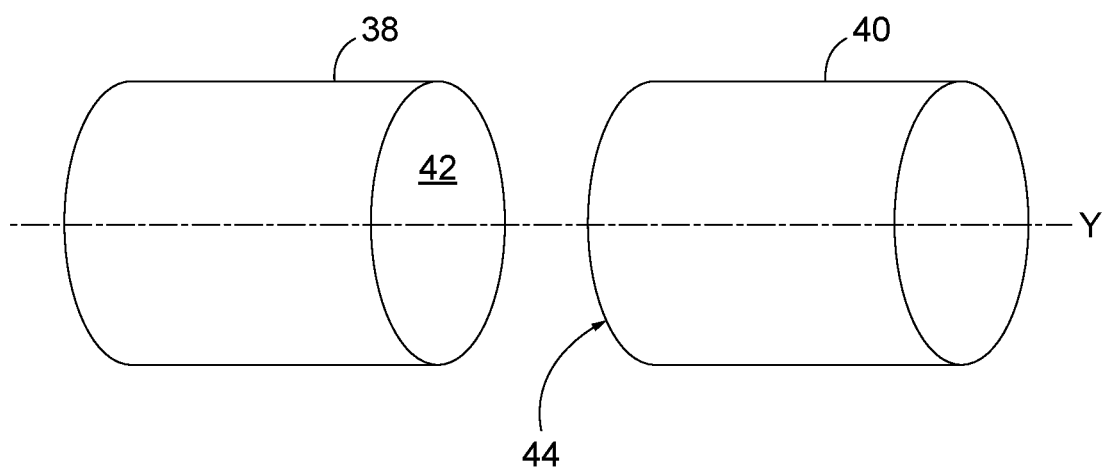
FIG. 2 illustrates an example first blank slug and second blank slug.

In a first method, as shown in FIG. 2, a first blank slug 38 and a second blank slug 40 can be provided. Each of the first and second blank slugs 38, 40 can be substantially cylindrical in shape, though various other shapes are possible (e.g., square, rectangle, triangular, octagonal, polygonal, etc.). Indeed, one advantage of friction welding is that the two elements to be welded together do not need to have the same shape, profile, or cross-sectional area. Moreover, the first and second blank slugs 38, 40 can be substantially identical in shape and/or size, or the first and second blank slugs 38, 40 can be different in shape and/or size. The first and the second blank slugs 38, 40 can be welded together via a friction welding process. In one embodiment, a surface 42 of the first blank slug 38 is driven across a surface 44 of the second blank slug 40 along a predetermined pattern while applying a forging force along a press axis Y to both blank slugs 38, 40 to compress the surfaces 42, 44 together to generate friction therebetween. When using a "spin welding" technique, preferably, the slugs have a rotationally symmetrical shape and the press axis Y is the rotational axis of slugs, although this is not required.

In a first embodiment, the first and second blank slugs 38, 40 can be welded together via a friction welding process where the surface 42 of the first blank slug 38 is slid back-and-forth (i.e., linear sliding/translational movement) in a periodic, oscillating manner across the surface 44 of the second blank slug 40 while applying the forging force along the press axis Y to the blank slugs 38, 40 to compress the surfaces 42, 44 together. In another embodiment, the first and second blank slugs 38, 40 can be welded together via a friction welding process where the surface 42 of the first blank slug 38 is rotated about the press axis Y. The forging force is applied along the press axis Y to the blank slugs 38, 40 to compress together the rotating surface 42 of the first blank slug 38 and the surface 44 of the second blank slug 40.

Once welded together, the first blank slug 38 can then be machined to form a fitting such as, for example, the fluid fitting 10 described above. Moreover, the second blank slug 40 can be machined to form a fluid element such as, for example, a flange or other type of fluid connector. However, the final machined shape of the first and second blank slugs 38, 40 is not so limiting and the first and second blank slugs 38, 40 can be machined to any desired shape for a desired use. Such machining of the first and second blank slugs 38, 40 can include, for example, turning, drilling and/or milling processes to remove material from the first and second blank slugs 38, 40. Moreover, such machining can be carried out by computer numerical control (CNC) or by manual operation of machining equipment.

The first method described above can be particularly useful for connecting two workpieces that cannot be machined prior to welding or where it is undesirable to do so. For instance, if two workpieces have machined portions that cannot withstand the temperature or motion of friction welding, the first and second blank slugs 38, 40 can be welded together first and then the slugs can be machined to form the desired workpieces.

Figure 3:
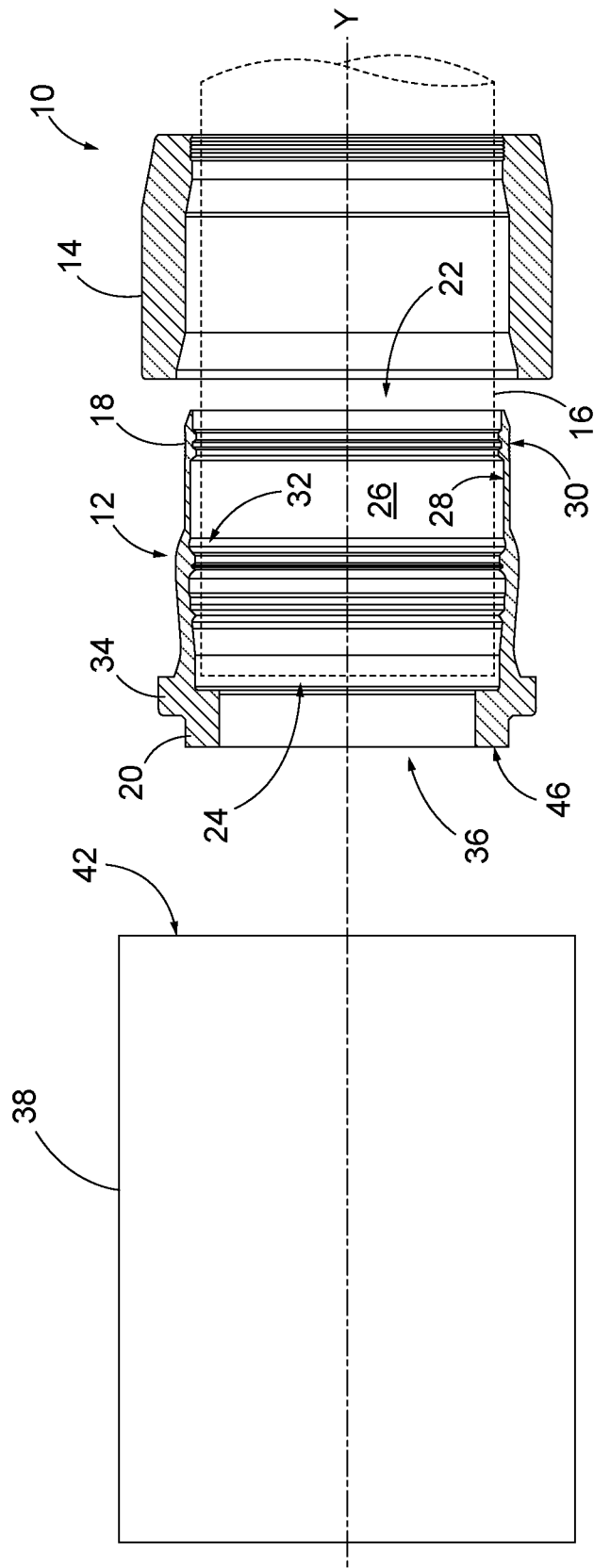
FIG. 3 illustrates the first blank slug and the example fluid fitting shown in FIG. 1.

In a second method, as shown in FIG. 3, the first blank slug 38 may be provided along with a pre-manufactured fitting such as, for example, the fluid fitting 10 described above. The first blank slug 38 and the fluid fitting 10 can be welded together via a friction welding process. In one embodiment, a surface 42 of the first blank slug 38 is driven across a surface 46 of the fluid fitting 10 along a predetermined pattern while applying a forging force along a press axis Y to both the first blank slug 38 and the fluid fitting 10 to compress the surfaces 42, 46 together to generate friction therebetween.

In a first embodiment, the first blank slug 38 and the fluid fitting 10 can be welded together via a friction welding process where the surface 42 of the first blank slug 38 is slid back-and-forth (i.e., linear sliding/translational movement) in a periodic, oscillating manner across the surface 46 of the fluid fitting 10 while applying the forging force along the press axis Y to the first blank slug 38 and the fluid fitting 10 to compress the surfaces 42, 46 together. In another embodiment, the first blank slug 38 and the fluid fitting 10 can be welded together via a friction welding process where the surface 42 of the first blank slug 38 is rotated about the press axis Y. The forging force is applied along the press axis Y to the first blank slug 38 and the fluid fitting 10 to compress together the rotating surface 42 of the first blank slug 38 and the surface 46 of the fluid fitting 10.

Once welded together, the first blank slug 38 can then be machined to form a fluid element such as, for example, a flange or other type of fluid connector. However, the final machined shape of the first blank slug 38 is not so limiting and the first blank slug 38 can be machined to any desired shape for a desired use. Such machining of the first blank slug 38 can include, for example, turning, drilling and/or milling processes to remove material from the first blank slug 38. Moreover, such machining can be carried out by computer numerical control (CNC) or by manual operation of machining equipment.

Figure 4:
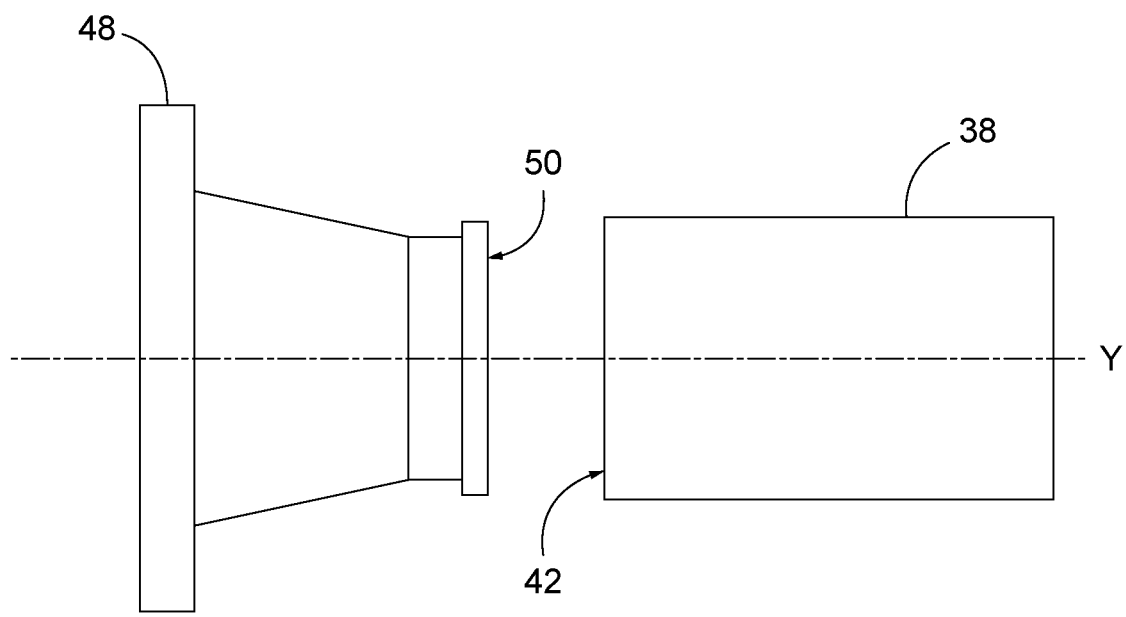
FIG. 4 illustrates the first blank slug and an example end connector.

In a third method, as shown in FIG. 4, the first blank slug 38 may be provided along with a pre-manufactured fluid element such as, for example, an off-the-shelf or custom connector 48. The first blank slug 38 and the connector 48 can be welded together via a friction welding process. In one embodiment, a surface 42 of the first blank slug 38 is driven across a surface 50 of the connector 48 along a predetermined pattern while applying a forging force along a press axis Y to both the first blank slug 38 and the connector 48 to compress the surfaces 42, 50 together to generate friction therebetween.

In a first embodiment, the first blank slug 38 and the connector 48 can be welded together via a friction welding process where the surface 42 of the first blank slug 38 is slid back-and-forth (i.e., linear sliding/translational movement) in a periodic, oscillating manner across the surface 50 of the connector 48 while applying the forging force along the press axis Y to the first blank slug 38 and the connector 48 to compress the surfaces 42, 50 together. In another embodiment, the first blank slug 38 and the connector 48 can be welded together via a friction welding process where the surface 42 of the first blank slug 38 is rotated about the press axis Y. The forging force is applied along the press axis Y to the first blank slug 38 and the connector 48 to compress together the rotating surface 42 of the first blank slug 38 and the surface 50 of the connector 48.

Once welded together, the first blank slug 38 can then be machined to form a fitting such as, for example, the fluid fitting 10 described above. However, the final machined shape of the first blank slug 38 is not so limiting and the first blank slug 38 can be machined to any desired shape for a desired use. Such machining of the first blank slug 38 can include, for example, turning, drilling and/or milling processes to remove material from the first blank slug 38. Moreover, such machining can be carried out by computer numerical control (CNC) or by manual operation of machining equipment.

The second and third methods described above can be particularly useful for connecting two workpieces where one component is pre-manufactured and the other component cannot be machined, or it is undesirable to be machined, prior to welding. Moreover, the second and third methods described above can be particularly useful for connecting two workpieces where machining for one component would be difficult post-welding.

Figure 5:
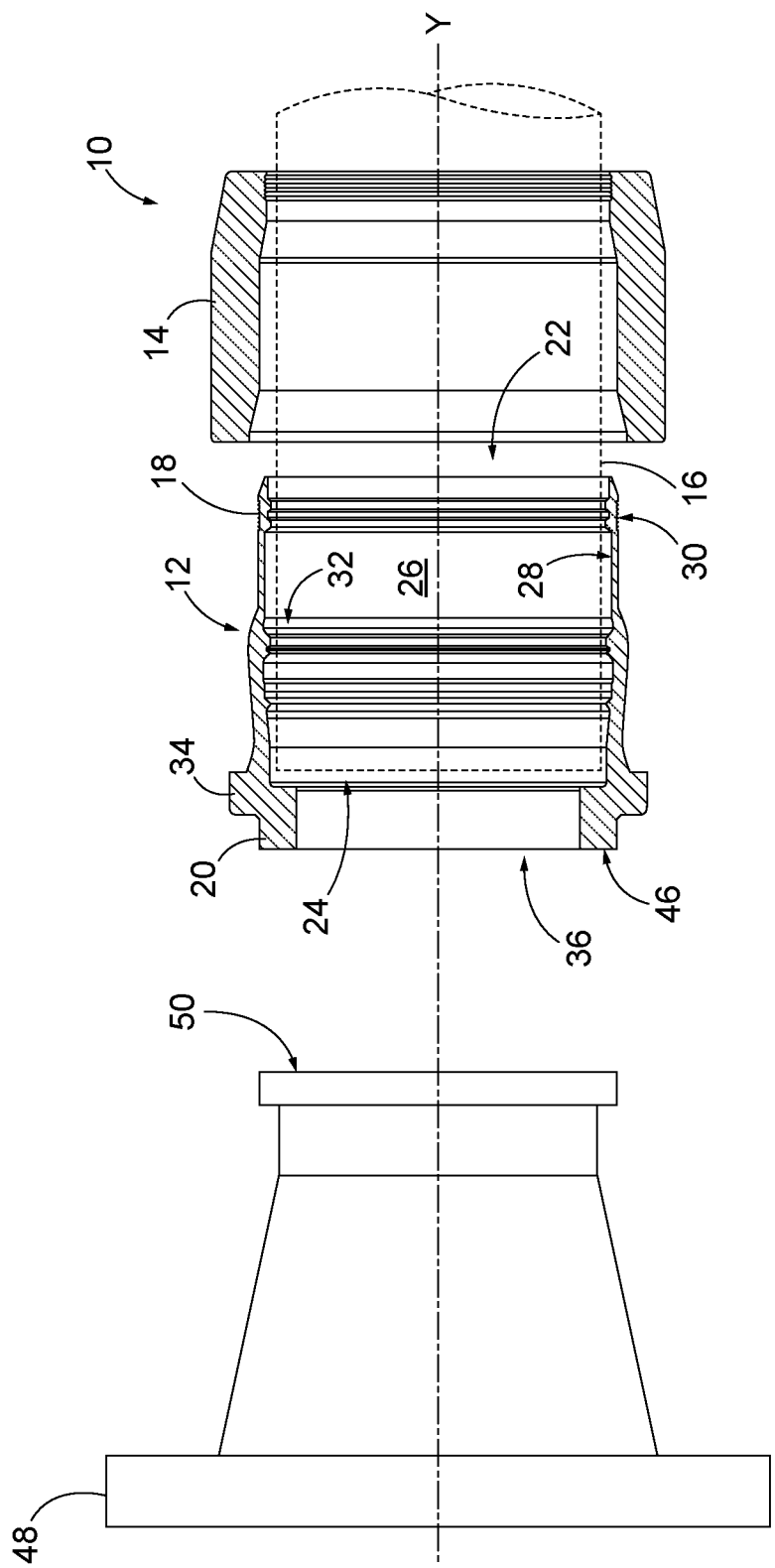
FIG. 5 illustrates the example end connector shown in FIG. 4 and the example fluid fitting shown in FIG. 1.

In a fourth method, as shown in FIG. 5, a pre-manufactured fluid element may be provided such as, for example, an off-the-shelf connector 48. Moreover, a pre-manufactured fitting such as, for example, the fluid fitting 10 described above may also be provided. The fluid fitting 10 and the connector 48 can be welded together via a friction welding process. In one embodiment, a surface 46 of the fluid fitting 10 is driven across a surface 50 of the connector 48 along a predetermined pattern while applying a forging force along a press axis Y to both the fluid fitting 10 and the connector 48 to compress the surfaces 46, 50 together to generate friction therebetween.

In a first embodiment, the fluid fitting 10 and the connector 48 can be welded together via a friction welding process where the surface 46 of the fluid fitting 10 is slid back-and-forth (i.e., linear sliding/translational movement) in a periodic, oscillating manner across the surface 50 of the connector 48 while applying the forging force along the press axis Y to the fluid fitting 10 and the connector 48 to compress the surfaces 46, 50 together. In another embodiment, the fluid fitting 10 and the connector 48 can be welded together via a friction welding process where the surface 46 of the fluid fitting 10 is rotated about the press axis Y across the surface 50 of the connector 48 while applying the forging force along the press axis Y to the fluid fitting 10 and the connector 48 to compress the surfaces 46, 50 together. In another embodiment, the fluid fitting 10 and the connector 48 can be welded together via a friction welding process where the surface 46 of the fluid fitting 10 is rotated about the press axis Y. The forging force is applied along the press axis Y to the fluid fitting 10 and the connector 48 to compress together the rotating surface 46 of the fluid fitting 10 and the surface 50 of the connector 48.

The fourth method described above can be particularly useful for connecting two workpieces where both workpieces are pre-manufactured. Moreover, the fourth method described above can also be useful for connecting two workpieces where machining for both workpieces would be difficult post-welding.

During "linear friction welding" it may be preferable to slide the workpiece along an axis perpendicular to the press axis Y in order to generate the desired friction. However, the angle of the axis the workpiece is slid along need not be perpendicular and can be any angle as long as the movement of the workpiece generates sufficient friction. Moreover, it is contemplated that the workpiece may be slid along multiple axes at various angles relative to the press axis Y to generate the desired friction.

Any of the manufacturing methods above can further be augmented with partial machining steps. For example, a blank slug can be partially machined to partially form a component, then friction welded to another component, and then finish machined to provide the finished component. Similarly, any of the components can be pre- and/or post-machined, as desired.

It is to be appreciated that only one element can be translated or rotated while the other element is stationary, although it is also contemplated that both elements can be translated, so long as there is relative movement sufficient to cause friction therebetween. For example, in one embodiment, the second workpiece is held still while the first workpiece is driven along a predetermined path, i.e. rotated for "spin welding" or linearly slid for "linear friction welding." In another embodiment, the second workpiece can be driven along a second predetermined path that is different from the first workpiece's predetermined path. In a version of this embodiment, the second workpiece is rotated about the push axis in an opposite direction compared to the rotation direction of the first workpiece in a "spin welding" operation. In another version, the first workpiece is rotated about the push axis at a first rotational velocity and the second workpiece is rotated about the push axis at a second rotational velocity. The second rotational velocity can be similar to or different from the first rotational velocity in any of speed and/or direction. In another version of this embodiment, the first workpiece is linearly slid along a first axis and the second workpiece is linearly slid along a second axis which is different than the first axis. In yet a further version of this embodiment, the first workpiece is linearly slid along a first axis at a first speed and the second workpiece is linearly slid along at a second speed which can be similar to or different than the first speed. Any of above embodiments can be used alone or in combination to produce the desired friction. Further, the elements can be driven along any desired pattern according to the desired use so long as there is relative movement sufficient to cause friction therebetween.

Two example types of processes for driving the surfaces against each other will now be discussed, Direct-Drive Rotary Friction and Inertia Friction Welding. The direct-drive method provides continuous speed control through the cycle, and stops according to a computer parameter developed specific for the part. Inertia Friction Welding uses a flywheel to generate the rotational momentum in the part-holding chuck in a "spin weld" operation. The flywheel driven chuck spins until it stops when the weld zone seizes. Although these two types of processes may be used, it is understood that other types of friction welding driving processes can be used.

Additionally, in order to align the surface of the first workpiece with the surface of the second workpiece for any of the manufacturing methods above, either or both of the first workpiece and the second workpiece can include an alignment structure. In one embodiment, the alignment structure is used to ensure accurate concentricity of the workpieces during the friction welding process. This can be particularly useful for the rotated "spin welding" technique. It is to be appreciated that although the embodiments exemplified in FIGS. 6-7 are shown on the surfaces of the blank slugs 38, 40, the embodiments can also be included on the surfaces of the fluid fitting 10, the pre-manufactured pipe 16 or fluid element, end connector 48, etc., and/or any other type of workpiece that is consistent with desired use.

In one embodiment, shown in FIG. 6A, the second blank slug 40 can include a recessed circular groove 52 machined into the surface 44 of the second blank slug 40, and the first blank slug 38 can include a corresponding raised ridge or a circular ring 54 machined on the surface 42 that fits within the groove 52 of the second blank slug 40, or vice versa. In still yet another example, both of the first and second blank slugs 38, 40 can feature raised circular rings that fit within grooves of the opposite part to provide a double alignment structure. These raised rings can be concentric, have different diameters (e.g., the diameter of the raised ring on the first workpiece can be larger than the diameter of the raised ring on the second workpiece, or vice-versa), have similar diameters, be non-concentric, or any other desired configuration for a desired use. The alignment structures can comprise continuous rings or can comprise discrete parts. Preferably the alignment structures are rotationally symmetric about the rotation axis and also rotationally balanced to avoid eccentric vibration of the parts. Additionally, the length offset caused by the ring/groove combination should not stop at least some portion of the surfaces 42, 44 from direct contact as desired for friction welding.

It is further contemplated that any of the raised ridges 54 and/or corresponding grooves 52 can have a rounded edge or tapered edge geometry that facilitates alignment and proper insertion of the raised ring into the appropriate groove. For example, as shown in FIGS. 6B-6D, in various embodiments the tapered edge could extend from the rotational axis outwards (i.e., towards the exterior diameter/perimeter, such as 54B shown in FIG. 6B) or could extend from the rotational axis inwards (i.e., towards the rotational axis, such as 54C shown in FIG. 6C) or could form a triangular shape (such as, 54D shown in FIG. 6D). When the forging force is applied to the parts, the angled surfaces can act as a cam to self-align the alignment structures between the parts so as to make the rotational axes of the parts concentric. However, these discussed shapes are not limiting and the ridge can take any shape for a desired use. Where two or more raised rings are used, it is contemplated that some could taper inwards while others taper outwards, however, the relationship between the rings is not so limiting and they can take any desired shape. In one embodiment, the weld surface of the first and/or the second blank slug can be machined to form the raised ridge, recessed groove, or circular ring. In another embodiment, the raised ridge, recessed groove, or circular ring can be formed separately from and attached to the first and/or second blank slug.

Figure 7:
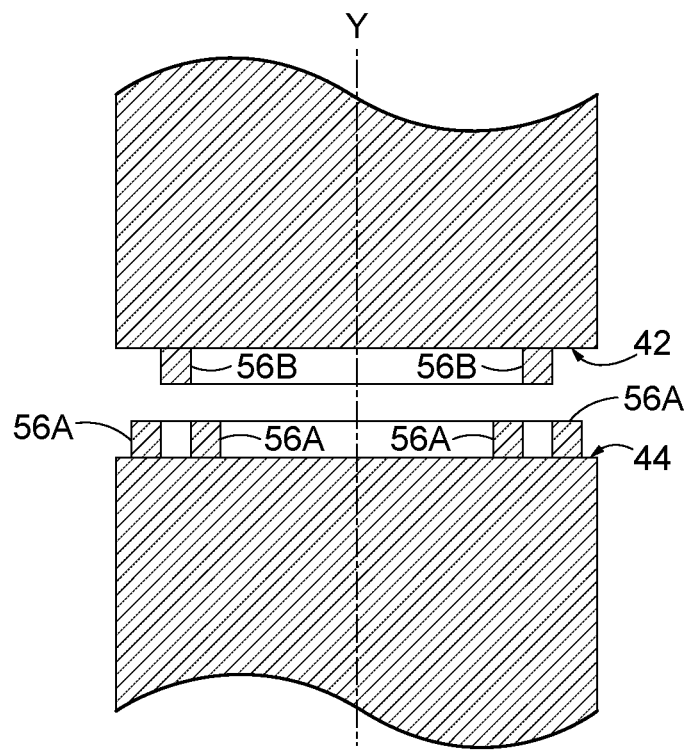
FIG. 7 schematically illustrates another example alignment structure.

In a further embodiment, shown in FIG. 7, raised ridges can be used without grooves, whereby both the first and second blank slugs 38, 40 include a raised ridge 56A, 56B. In one embodiment, the second blank slug 40 includes a pair of ridges 56A machined on the surface 44 and the first blank slug 38 includes a ridge 56B of intermediate diameter that is received and centered between the pair of ridges 56A. In other words, the gap or valley between the pair of radially spaced apart raised ridges 56A can act as a centering groove for the opposite ridge 56B. It is further possible that two or more raised ridges can be used on both of the workpieces. It is further contemplated that each part may utilize only one extended ridge, i.e., only one raised ridge 56A and one raised ridge 56B. In this manner, contact between the two opposed raised ridges 56A, 56B under application of the forging force will cause the parts to be aligned concentric. Various combinations and variations of these ridges can be used, as desired to maintain concentricity of the workpieces during the spin welding process. Further, the raised ridges can have a rounded edge or tapered edge geometry that facilitates alignment and proper insertion of the raised ring into the appropriate gap or valley. For example, the raised ridges can have tapered edges as discussed above or can use any shape according to a desired use. The alignment structures can comprise continuous rings or can comprise discrete parts. Preferably the alignment structures are rotationally symmetric about the rotation axis and also rotationally balanced to avoid eccentric vibration of the parts. Additionally, the length offset caused by the ring combination should not stop at least some portion of the surfaces 42, 44 from direct contact as desired for friction welding.

In one embodiment, the weld surface of the first and/or second blank slug can be machined to form the raised ridge or circular ring. In another embodiment, the raised ridge or circular ring can be formed separately from and attached to the first and/or second blank slug. Lastly, although the raised ridges and grooves are illustrated on the end faces or surfaces that will be friction welded, it is contemplated that these or other alignment structure can be located on non-welded surfaces, such as the external diameter and/or internal diameter of the first workpiece and/or the second workpiece. Other types of alignment structure can be used that are suitable for use with a rotating process whereby the two parts are brought together while rotating relative to each other.

Figure 8:
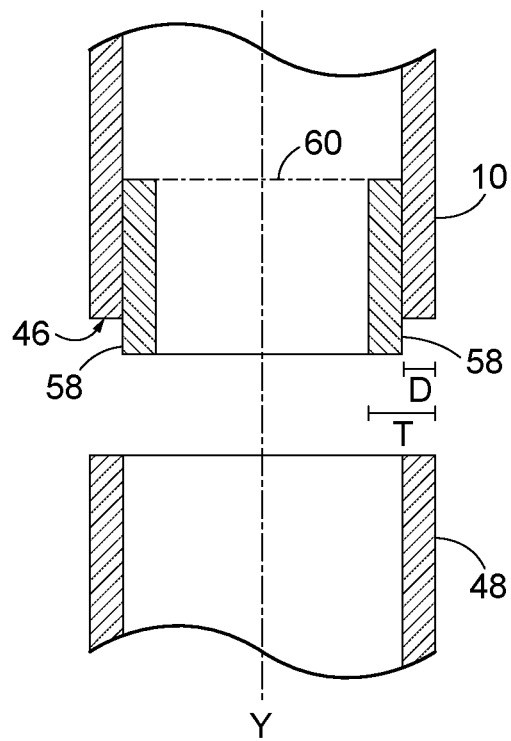
FIG. 8 schematically illustrates yet another example alignment structure.

In a yet further embodiment, shown in FIG. 8, an internal diameter ("ID") alignment boss 58 is provided on either or both of the first or second workpiece. More specifically, the ID alignment boss 58 is designed to have a maximum outer diameter that corresponds to the ID of the opposite body. In the following discussion, reference is made to the ID alignment boss 58 being located on the fluid fitting 10, however, it is not so limiting and the ID alignment boss 58 can be attached to any desired workpiece consistent with a desired use.

In the embodiment, shown in FIG. 8, the ID alignment boss 58 is provided on the fluid fitting 10, and the maximum outer diameter of the ID alignment boss 58 can correspond to the ID of an end connector 48. The maximum outer diameter of the ID alignment boss 58 can be equal or substantially equal (slightly larger or smaller, either intentionally or due to manufacturing tolerances) to the ID of the end connector 48. One advantage to this approach is that the additional surface area provided by this design can provide a more stable and consistent friction weld considering the alignment boss will be consumed by the weld upset and may reduce the possibility of lack of fusion. The ID alignment boss 58 extends a predetermined distance outwardly from the weld surface 46 of the fluid fitting 10. Where the alignment boss is monolithic with the fluid fitting 10, the ID alignment boss's 58 rear most point may extend the entire length of the passageway or bore 26. In another embodiment, the rear most point can be located in line with the weld surface 46 of the fluid fitting 10 or the ID alignment boss 58 can extend a predetermined distance inwardly into the passageway or bore 26. In one embodiment, the ID alignment boss 58 extends partially along the length of the passageway or bore 26 to a position schematically indicated by the phantom line 60.

The ID alignment boss 58 can be formed in any manner consistent with the desired use. In one embodiment, the ID alignment boss 58 is monolithic with the fluid fitting 10 (despite the different schematic cross-hatch pattern shown in FIG. 8) and is manufactured by forming the fluid fitting 10 with a passageway or bore 26 and a total wall thickness T. A portion of the outer surface of the wall (thickness D) is then removed (i.e. machined) along a preselected length of the fluid fitting 10 to form the ID alignment boss 58. The thickness D removed makes the outer diameter of the alignment boss 58 less than or substantially equal to the inner diameter of the end connector 48. In another embodiment, the fluid fitting 10 is formed with a passageway or bore 26 and a total wall thickness D. A separate piece (e.g. another pipe or insert) corresponding to the desired shape and size of the ID alignment boss 58 that can then be attached to the fluid fitting 10 in a non-leaking manner, e.g. by partial insertion into the passageway or bore 26.

The manufacturing methods above are also useful for flexible manufacturing that supports "make to order" (MTO) operations. For example, countless types and configurations of a fluid manifold or other custom fluid coupler can be readily manufactured using a friction welding process as described herein. Although the term "manifold" is used here by way of example, it is understood that this description can similarly apply to various pipe sections or elements which transfer fluids but may not fit the traditional definition of a "manifold." Different types of fluid fittings, connectors, etc., can be welded in a fluid-tight manner to different locations upon a major manifold element. These fluid fittings and connectors may include the fluid fitting 10 described herein or various other types of pre-manufactured fluid components. The major manifold element can have a square or rectangular geometry with relatively flat sides, a curved geometry (e.g., with a circular or oval cross-section) with a curved exterior surface, or any geometry consistent with the desired use.

In order to manufacture a custom manifold or other "make to order" part, a through hole or aperture can first be cut into the exterior surface of the major manifold element. Next, the component to be attached is aligned over the cut hole (e.g., an axis of the component is co-axial with an axis of the cut hole), and is attached via friction welding using any of the methods described herein. Any pre-weld or post-weld machining operations can be performed. It is contemplated that either or both of the manifold and component can be driven along a predetermined path to provide the relative movement sufficient for friction welding.

Where the surfaces to be welded together are significantly circular, it may be preferable to use any of the spin welding methods described herein to friction weld the surfaces together, however any of the linear friction welding methods described herein may also be used. Where the surfaces to be welded together are not significantly circular or where one component cannot be rotated relative to the other, it may preferable to use any of the linear friction welding methods described herein to friction weld the surfaces. Linear friction welding provides a distinct benefit in that the exact fluid fittings, connectors, etc. desired by an end user/customer can be positioned and oriented exactly as needed upon a major manifold element, which is often required when replacing or retrofitting new elements into an old, existing system.

Figure 9:
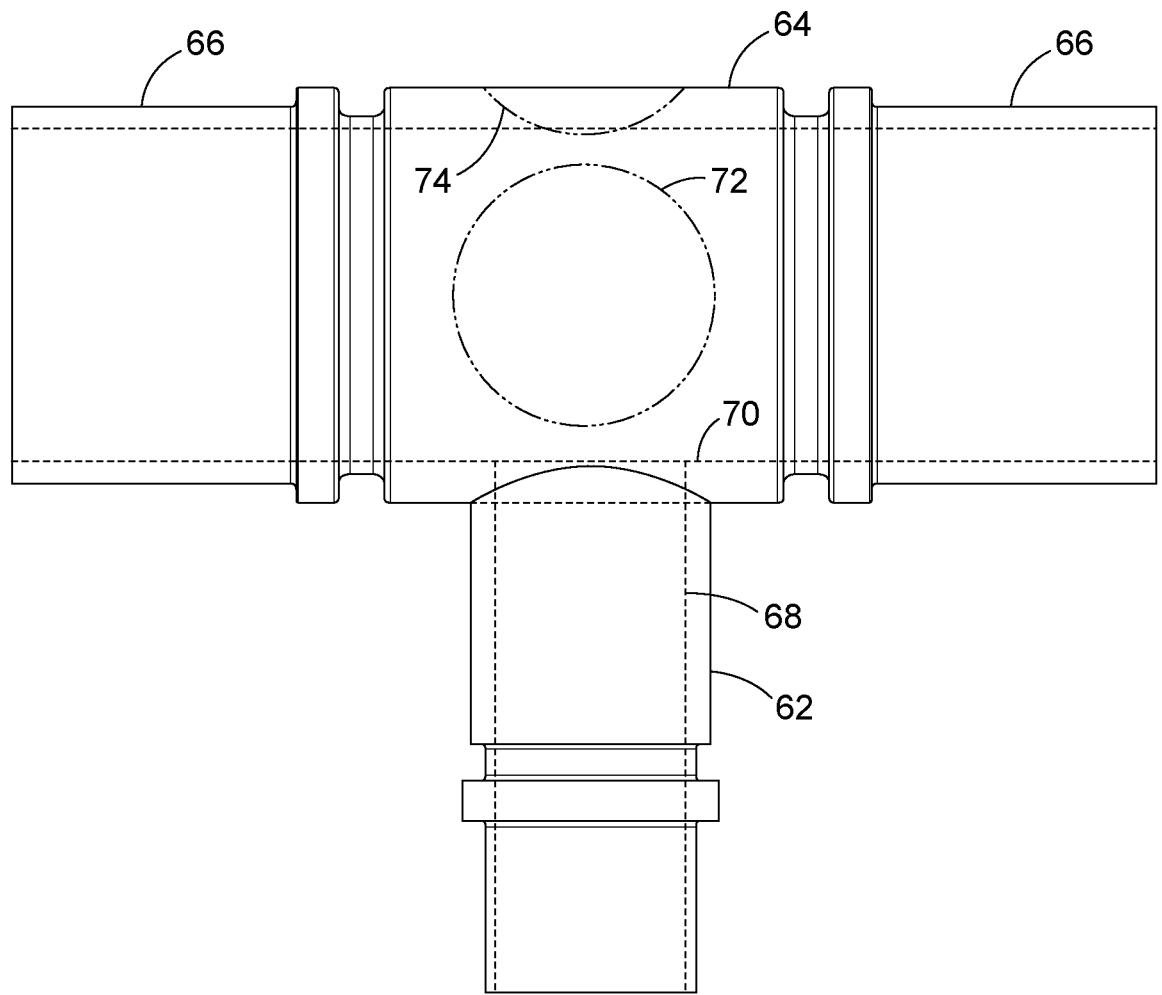
FIG. 9 illustrates a fluid fitting friction welded to a pipe section.

FIG. 9 shows an example "make to order" T-connector utilizing a fluid fitting 62 that is attached, using the linear friction welding method described herein, to a standard pipe section 64. Although a standard pipe section 64 is used in this example, it is understood that virtually any fluid body including non-standard pipe sections or manifolds can be used to connect one or more fluid fittings thereto. The pipe section 64 can further include additional fluid fittings 66 (pre-machined or post-machined). When the fluid fitting 62 is friction welded to the pipe section 64, a fluid passageway 68 of the fluid fitting 62 will be in fluid communication with a fluid passageway 70 of the pipe section 64. Further workpieces can additionally be friction welded to the pipe section 64. A through hole or aperture can first be cut into the exterior surface of the pipe section 64 such as at the sections marked by the phantom lines 72, 74. Next, the workpiece to be attached is aligned over the cut hole (e.g., an axis of the workpiece is co-axial with an axis of the cut hole), and then the workpiece is attached via friction welding using any of the methods described herein. In the shown example of FIG. 9, a linear friction weld is used, although it is possible that a rotational friction weld could be used. As can be appreciated, where multiple workpieces or fluid fittings are attached to the pipe section, it is more likely that each will be attached by separate linear friction welding techniques (especially where the manufactured combination becomes less rotationally symmetrical or balanced and is less useful for rotational spin welding). Afterwards, any pre-weld or post-weld machining operations can be performed. In the example embodiment shown in FIG. 9, the hole or aperture is substantially circular, however the hole or aperture can take any shape or size for the desired use.

Figure 10A:
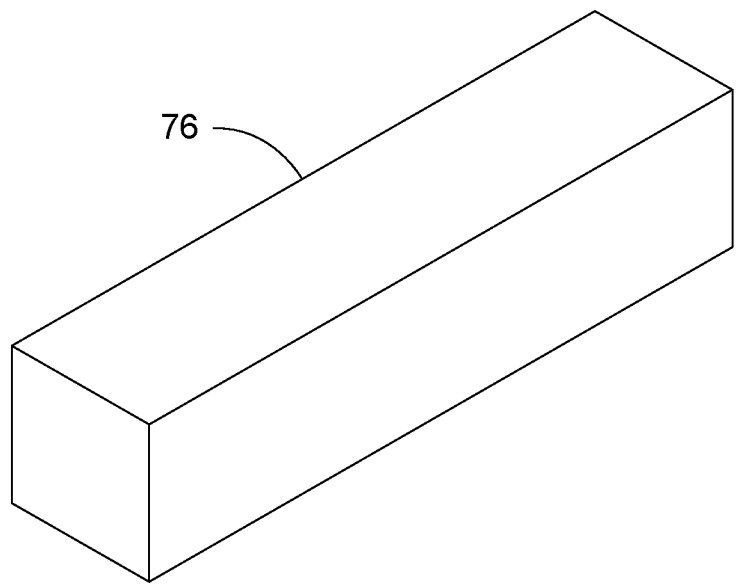
FIGS. 10A-10B illustrates an example "make to order" (MTO) manifold possible with the friction welding manufacturing method herein.
Figure 10B:
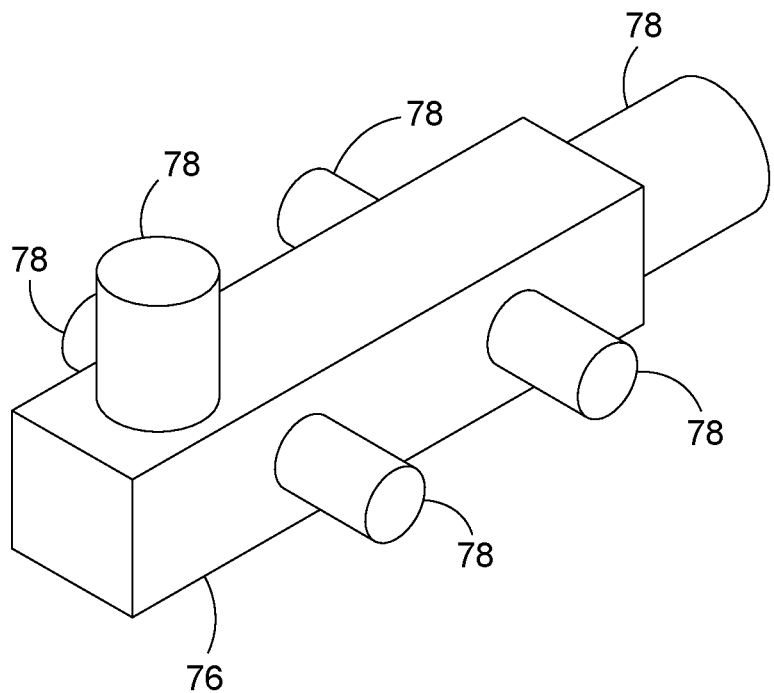

FIGS. 10A and 10B show a further example embodiment of a "make to order" part. The example embodiment includes a manifold with a plurality of workpieces attached using the linear friction welding methods described herein. For example, as shown in FIG. 10, countless types and configurations of a fluid manifold or other custom fluid coupler can be readily manufactured using a linear friction welding process as described herein. Although the term "manifold" is used here by way of example, it is understood that this description can similarly apply to various pipe sections or elements which transfer fluids but may not fit the traditional definition of a "manifold." As shown in the various depicted examples, different types of fluid fittings, connectors, etc., can be welded in a fluid-tight manner to different locations upon a major manifold element. These fluid fittings and connectors may include the fitting 10 described herein or various other types of pre-manufactured fluid components. In the example shown in FIG. 10A, the manifold 76 is illustrated as a generally rectangular shape with a generally square cross-section, although this is simply for convenience of illustration. It is to be appreciated that the manifold 76 can have various geometries, lengths, etc. that is consistent with the desired use. Moreover, although the major manifold element is schematically depicted as having a square or rectangular geometry with relatively flat sides, it is contemplated that the major manifold element can also be a curved pipe (e.g., with a circular cross-section) with a curved exterior surface. In the example shown in FIG. 10B, the plurality of workpieces comprise cylindrical slugs 78 of various sizes. However, the plurality of workpieces can comprise workpieces that are all uniform in size and shape or can comprise workpieces that vary in size and/or shape. Any combination of size or shape for each of the plurality of workpieces is hereby contemplated that are consistent with the desired use. An advantage of friction welding is that multiple workpieces can be welded at various orientations to a single manifold. In the example shown in FIG. 10B, in particular where the manifold 76 has a non-rotationally symmetrical shape or in situations where the manifold is located or pre-installed in a non-manufacturing location (i.e., in the field, etc.), the slugs 78 are linear friction welded on various sides of the manifold 76 at various angles to other workpieces. The plurality of workpieces can be welded on the manifold at any desired orientation consistent with the desired use. Although FIG. 10B shows the plurality of workpieces as slugs 78, some or all of these in the example embodiment can also include the fluid fitting 10, the pre-manufactured pipe 16 or fluid element, end connector 48, etc., and/or any other type of workpiece that is consistent with desired use. Indeed, depending upon the desired use case, it may present a manufacturing advantage to utilize pre-manufactured fluid fittings 10 or pipes 16, fluid elements, end connectors 48, etc. and attach these to the manifold 76.

In order to manufacture a custom manifold or other "make to order" part, a similar process can be used as described with FIG. 9. For example, a through hole or aperture can first be cut into the exterior surface of the major manifold element. Next, the fluid element to be attached is aligned over the cut hole (e.g., co-axial), and is attached via linear friction welding using any of the methods described herein (first, second, third, fourth). Any pre-weld or post-weld machining operations can be performed. It is contemplated that either or both of the manifold and fluid fitting can be moved/translated to provide the relative linear movement sufficient for friction welding. With regards to the unique and non-symmetrical shapes shown in FIG. 10A-B, this provides a distinct advantage over spin welding. Thus, linear friction welding provides a distinct benefit in that the exact fluid fittings, connectors, etc. desired by an end user/customer can be positioned and oriented exactly as needed upon a major manifold element, which is often required when replacing or retrofitting new elements into an old, existing system.

Figure 11A:
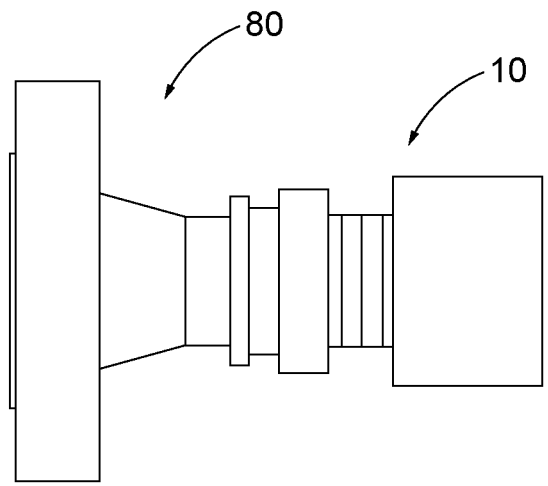
FIGS. 11A-11D illustrate various examples of a fluid fitting friction welded to various fluid elements.
Figure 11B:
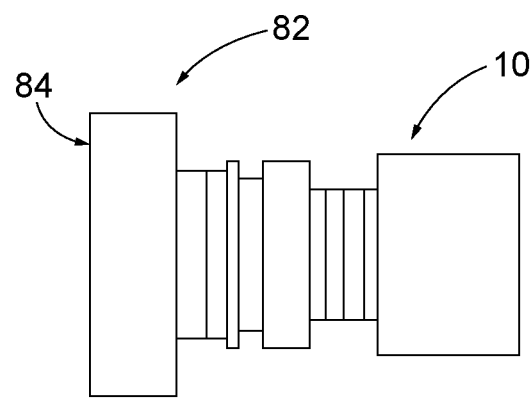
Figure 11C:
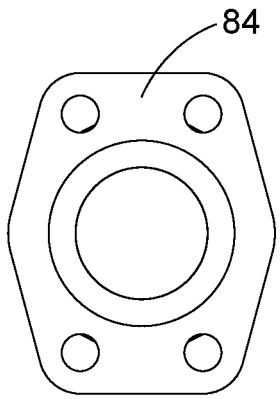
Figure 11D:
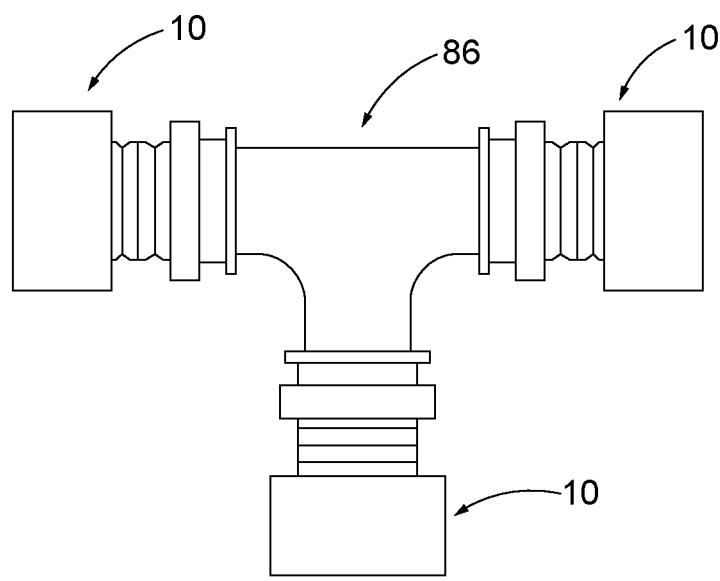

FIGS. 11A-11D show just a few more example embodiments of many possible "make to order" parts. In the example embodiments, the fluid fitting 10 described above has been connected to various fluid elements via the friction welding methods described herein. For instance, FIG. 11A shows the fluid fitting 10 connected to a circular flange connector 80. Moreover, FIG. 11B shows the fluid fitting 10 connected to a hexagonal flange connector 82, and FIG. 11C shows an outward facing surface 84 of that hexagonal flange connector. Although the flange connectors shown in FIGS. 11A-11C are circular or hexagonal, the flange connector can take any shape consistent with the desired use (e.g. triangular, rectangular, square, oval, orthogonal, polygonal, custom shaped, etc.). Furthermore, FIG. 11D shows three fluid fittings 10 connected to the ends of an example T-connector 86. These example embodiments exemplify possible "make to order" parts formed by the friction welding methods described herein and do not function to limit the scope of the described invention; indeed, the friction welding methods described herein could be used to create virtually any desired custom fluid transfer part or assembly. As can be appreciated, these or other embodiments can be created utilizing Applicant's fluid fitting that is attached, using the rotational friction welding or linear friction welding methods described herein, to a standard pipe section, end connector, or to a pipe section that includes additional fluid fittings (pre-machined or post-machined.

Several advantages of the proposed manufacturing methods described herein include: Ability to weld complex shapes or circular shapes at all stages of components (finished, semi-finished, and raw stock); Readily join combinations of steels & non-ferrous metals; Dissimilar metal combinations can be joined; Powder metal components can be welded to other powder metals, forgings, casting or wrought materials; Reduced HAZ (heat affected zone); Improved weld quality; Improved component quality; State of the art process uniquely applied to pressure containing pipe components; Reduced cost by post weld machining (eliminates loss of expensive half-body); Flexible manufacturing uniquely designed to support "make to order" (MTO) operations; State of the art process that cannot be duplicated in the field; and Eliminates expensive forgings and the required testing to meet mechanical requirements.

Applicant further conducted experimental tests during the development of this device that produced surprising results to show that the friction welding methods described herein produced a superior part at reduced manufacturing costs as compared to the prior art. Initial test were conducted on 2" NPS carbon steel coupons. Material used for the coupons was A106 and ASTM 513 DOM material. Joint configuration used on the coupons was a square butt joint. NOT and destructive tests were conducted on the friction welded coupons. All NOT test included radiography examination per ASME B31.3 Normal Service. Destructive testing included tensile and guided bend test as well as macro hardness examination including full profile hardness test. All NOT and destructive tests were acceptable.

The Radiography examination showed a fully penetrated weld 360 degrees around the weld joint with no porosity present in the weld. The weld was somewhat difficult to distinguish from the base metal due to the relatively small weld interface and reduced HAZ. The weld bead appeared on the x-ray as a slightly brighter section of material primarily due to the homogeneous make-up of the weld bead and the slightly denser weld material in comparison to the base metal. The etched cross-section in the macro-hardness test showed a narrow consistent weld bead approximately ⅛" in width with a full consistent bond-line through the base material. The weld size was approximately half the size of a conventional GTAW-P weld.

The hardness test results were more revealing and showed relatively small hardness changes across the weld bead and bond-lines. The weld section showed a slight increase in hardness over the HAZ and base metal. These results are consistent with a uniform, homogenous weld zone that is typically stronger than the base material and maintains the mechanical properties of the base metal. In comparison, a GTAW-P weld typically has elevated hardness in the HAZ but a considerable reduction in hardness in the weld bead. The hardness test results were as follows, in physical order (left to right): Base material (SA106): 198; HAZ: 225; WELD: 256 HAZ: 217; Base material (SAS13): 229. The tensile test results of the friction final weld strength of an A106 tube that was friction welded to an A513 tube were as follows, done in accordance with ASTM A370: Width (in): 0.25; Thickness (in): 0.168; Area (sq. in.): 0.042; Gage length (in): 1.0; Yield strength: 54,000; Tensile strength: 81,500; Elongation (%): 27; Fracture location: A106 base metal.

The invention has been described herein above using specific examples; however, it will be understood by those skilled in the art that various alternatives may be used and equivalents may be substituted for elements or steps described herein without deviating from the scope of the invention. Modifications may be necessary to adapt the invention to a particular situation or to a particular need without departing from the scope of the invention. It is intended that the invention not be limited to the particular implementation described herein, but that the claims be given their broadest interpretation to cover all embodiments, literal or equivalent, covered thereby.

What is claimed is:

1. A method of manufacturing a fluid system, the method comprising:
   providing a fluid fitting and a fluid element that is attached to at least a portion of the fluid fitting, the fluid fitting comprising:
   a coupling body having an inner surface defining a bore for receiving a pipe therein;
   a ring configured to fit over at least one end of the coupling body for mechanically attaching the coupling body to the pipe; and
   a main seal formed on the inner surface of the coupling body for engaging the pipe, wherein when the ring is installed on the at least one end of the coupling body via force, the ring and coupling body apply a compressive force to the main seal sufficient to cause elastic deformation of the ring and permanent deformation of the coupling body and pipe to thereby attach the pipe to the coupling body in a non-leaking manner,
   wherein the step of providing the fluid fitting and the fluid element includes:

placing a workpiece weld surface of a workpiece in contact with a fluid element weld surface of the fluid element;

driving one of the workpiece weld surface and the fluid element weld surface in a first predetermined pattern along the other of the workpiece weld surface and the fluid element weld surface;

applying pressure along a press axis between the workpiece weld surface and the fluid element weld surface so that said driving produces friction and heat for a time sufficient to raise a temperature of the workpiece weld surface and the fluid element weld surface to welding temperature;

stopping said driving while applying the pressure until the workpiece weld surface and the fluid element weld surface form a welded bond; and machining the workpiece after the welded bond is formed to form at least the portion of the fluid fitting, such that the fluid element is permanently sealed in a non-leaking manner to the portion of the fluid fitting by the weld joint.

2. The method of claim 1, wherein the first predetermined pattern is a rotational motion about the press axis.

3. The method of claim 1, wherein the first predetermined pattern is a linear motion along an axis perpendicular to the press axis.

4. The method of claim 1, further including a step of driving the other of the workpiece weld surface and the fluid element weld surface in a second predetermined pattern along the said one of the workpiece weld surface and the fluid element weld surface simultaneously with the step of driving said one of the workpiece weld surface and the fluid element weld surface in the first predetermined pattern along the other of the workpiece weld surface and the fluid element weld surface.

5. The method of claim 4, wherein the step of stopping said driving of said one of the workpiece weld surface and the fluid element weld surface includes stopping said driving of the other of the workpiece weld surface and the fluid element weld surface.

6. The method of claim 4, wherein the first predetermined pattern is a rotational motion about the press axis in a first rotational direction, wherein the second predetermined pattern is a rotational motion about the press axis in a second rotational direction which is opposite the first rotational direction.

7. The method of claim 4, wherein the first predetermined pattern is a rotational motion about the press axis at a first rotational velocity, wherein in the second predetermined pattern is a rotational motion about the press axis at a second rotational velocity which is different from the first rotational velocity.

8. The method according to claim 4, wherein the first predetermined pattern is a linear motion along an axis perpendicular to the press axis at a first velocity, wherein the second predetermined pattern is a linear motion along an axis perpendicular to the press axis at a second velocity which is different from the first velocity.

9. The method according to claim 4, wherein the first predetermined pattern is a linear motion along a first axis perpendicular to the press axis, wherein the second predetermined pattern is a linear motion along a second axis perpendicular to the press axis which is different from the first axis.

10. The method according to claim 1, further including a step of machining the workpiece before the welded bond is formed to form at least another portion of the fluid fitting.

11. The method according to claim 10, wherein the step of machining the workpiece after the weld joint is formed comprises machining the workpiece to form a further portion of the fluid fitting.

12. A method of manufacturing a fluid system, the method comprising:

providing a fluid fitting and a workpiece that is attached to at least a portion of the fluid fitting, the fluid fitting comprising:

a coupling body having an inner surface defining a bore for receiving a pipe therein;

a ring configured to fit over at least one end of the coupling body for mechanically attaching the coupling body to the pipe; and a main seal formed on the inner surface of the coupling body for engaging the pipe, wherein when the ring is installed on the at least one end of the coupling body via force, the ring and coupling body apply a compressive force to the main seal sufficient to cause elastic deformation of the ring and permanent deformation of the coupling body and pipe to thereby attach the pipe to the coupling body in a non-leaking manner, characterized in that the step of providing the fluid fitting and the first workpiece includes:

placing a fluid fitting weld surface of the fluid fitting in contact with a piece weld surface of the workpiece;

driving one of the fluid fitting weld surface and the piece weld surface in a first predetermined pattern along the other of the fluid fitting weld surface and the piece weld surface;

applying pressure along a press axis between the fluid fitting weld surface and the piece weld surface so that said driving produces friction and heat for a time sufficient to raise a temperature of the fluid fitting weld surface and the piece weld surface to welding temperature; and stopping said driving while applying the pressure until the fluid fitting weld surface and the piece weld surface form a welded bond, such that the workpiece is permanently sealed in a non-leaking manner to the portion of the fluid fitting.

13. The method of claim 12, wherein the first predetermined pattern is a rotational motion about the press axis.

14. The method of claim 12, wherein the first predetermined pattern is a linear motion along an axis perpendicular to the press axis.

15. The method of claim 12, further including a step of driving the other of the fluid fitting weld surface and the piece weld surface in a second predetermined pattern along said one of the fluid fitting weld surface and the piece weld surface simultaneously with the step of driving one of the fluid fitting weld surface and the piece weld surface in the first predetermined pattern along the other of the fluid fitting weld surface and the piece weld surface.

16. The method of claim 15, wherein the step of stopping said driving of said one of the fluid fitting weld surface and the piece weld surface includes stopping said driving of the other of the fluid fitting weld surface and the piece weld surface.

17. The method of claim 15, wherein the first predetermined pattern is a rotational motion about the press axis in a first rotational direction, wherein the second predetermined pattern is a rotational motion about the press axis in a second rotational direction which is opposite the first rotational direction.

18. The method of claim 15, wherein the first predetermined pattern is a rotational motion about the press axis at a first rotational velocity, wherein in the second predetermined pattern is a rotational motion about the press axis at a second rotational velocity which is different from the first rotational velocity.

19. The method according to claim 15, wherein the first predetermined pattern is a linear motion along an axis perpendicular to the press axis at a first velocity, wherein the second predetermined pattern is a linear motion along an axis perpendicular to the press axis at a second velocity which is different from the first velocity.

20. The method according to claim 15, wherein the first predetermined pattern is a linear motion along a first axis perpendicular to the press axis, wherein the second predetermined pattern is a linear motion along a second axis perpendicular to the press axis which is different from the first axis.

21. The method according to claim 12, wherein the workpiece is a fluid element.

22. The method of claim 21, wherein the first predetermined pattern is a rotational motion about the press axis.

23. The method of claim 21, wherein the first predetermined pattern is a linear motion along an axis perpendicular to the press axis.

24. The method of claim 21, further including a step of driving the other of the fluid fitting weld surface and the piece weld surface in a second predetermined pattern along said one of the fluid fitting weld surface and the piece weld surface simultaneously with the step of driving one of the fluid fitting weld surface and the piece weld surface in the first predetermined pattern along the other of the fluid fitting weld surface and the piece weld surface.

25. The method of claim 24, wherein the step of stopping said driving of said one of the fluid fitting weld surface and the piece weld surface includes stopping said driving of the other of the fluid fitting weld surface and the piece weld surface.

26. The method of claim 24, wherein the first predetermined pattern is a rotational motion about the press axis in a first rotational direction, wherein the second predetermined pattern is a rotational motion about the press axis in a second rotational direction which is opposite the first rotational direction.

27. The method of claim 24, wherein the first predetermined pattern is a rotational motion about the press axis at a first rotational velocity, wherein in the second predetermined pattern is a rotational motion about the press axis at a second rotational velocity which is different from the first rotational velocity.

28. The method according to claim 24, wherein the first predetermined pattern is a linear motion along an axis perpendicular to the press axis at a first velocity, wherein the second predetermined pattern is a linear motion along an axis perpendicular to the press axis at a second velocity which is different from the first velocity.

29. The method according to claim 24, wherein the first predetermined pattern is a linear motion along a first axis perpendicular to the press axis, wherein the second predetermined pattern is a linear motion along a second axis perpendicular to the press axis which is different from the first axis.

\* \* \* \* \*